United States Patent [19]

Kennelly et al.

[11] Patent Number: 5,750,458
[45] Date of Patent: *May 12, 1998

[54] COMBUSTION CATALYSTS CONTAINING BINARY OXIDES AND PROCESSES USING THE SAME

[76] Inventors: Teresa Kennelly, 31 Strawberry La., Belle Mead, N.J. 08502; John K. Hochmuth, 1706 Oak Ct., Monmouth Junction, N.J. 08852; Ting C. Chou, 1411 Oak Knoll Dr., San Jose, Calif. 95129; Robert J. Farrauto, 227 Seneca Pl., Westfield, N.J. 07090

[*] Notice: The term of this patent shall not extend beyond the expiration date of Pat. No. 5,102,639.

[21] Appl. No.: 271,687

[22] Filed: Jul. 7, 1994

Related U.S. Application Data

[62] Division of Ser. No. 684,409, Apr. 12, 1991, Pat. No. 5,378,142.

[51] Int. Cl.$^6$ .............................. B01J 23/10; C01F 17/00
[52] U.S. Cl. .......................... 502/304; 502/303; 502/302; 502/339; 502/262; 423/263
[58] Field of Search .................... 502/38, 302, 303, 502/304, 339, 355, 262; 423/263

[56] References Cited

U.S. PATENT DOCUMENTS

| | | |
|---|---|---|
| 3,846,979 | 11/1974 | Pfefferle . |
| 3,919,120 | 11/1975 | Kato et al. . |
| 3,928,961 | 12/1975 | Pfefferle . |
| 3,940,923 | 3/1976 | Pfefferle . |
| 3,975,900 | 8/1976 | Pfefferle . |
| 3,993,572 | 11/1976 | Hinden et al. . |
| 4,021,185 | 5/1977 | Hinden et al. . |
| 4,056,489 | 11/1977 | Hinden et al. . |
| 4,065,917 | 1/1978 | Pfefferle . |
| 4,089,654 | 5/1978 | Polinski et al. . |
| 4,094,142 | 6/1978 | Pfefferle . |
| 4,170,573 | 10/1979 | Ernest et al. . |
| 4,650,782 | 3/1987 | Onal ................. 423/213.5 |
| 4,720,473 | 1/1988 | Welch et al. ................. 502/38 |
| 4,791,091 | 12/1988 | Bricker et al. . |
| 4,793,797 | 12/1988 | Kato et al. ................. 431/7 |
| 4,843,056 | 6/1989 | Matsumoto et al. . |
| 4,861,938 | 8/1989 | Lewis et al. ................. 502/38 |
| 4,888,103 | 12/1989 | Herbst et al. . |
| 4,893,465 | 1/1990 | Farrauto et al. . |
| 4,906,176 | 3/1990 | Yamashita et al. ................. 431/7 |
| 5,000,929 | 3/1991 | Horiuchi et al. ................. 423/215.5 |
| 5,102,639 | 4/1992 | Chou et al. ................. 423/263 |
| 5,169,300 | 12/1992 | Chou et al. ................. 431/7 |
| 5,216,875 | 6/1993 | Kennelly et al. ................. 423/213.5 |
| 5,378,142 | 1/1995 | Kennelly et al. ................. 431/7 |

FOREIGN PATENT DOCUMENTS

| | | |
|---|---|---|
| 315896 | 5/1989 | European Pat. Off. . |
| 397411 | 11/1990 | European Pat. Off. . |
| 244339 | 12/1985 | Japan . |
| 140646 | 6/1987 | Japan . |
| 216642 | 9/1987 | Japan . |
| 088041 | 4/1988 | Japan . |
| 238311 | 10/1988 | Japan . |
| 294411 | 12/1988 | Japan . |
| 296842 | 12/1988 | Japan . |
| 57002 | 3/1989 | Japan . |
| 116305 | 6/1990 | Japan . |
| 169003 | 6/1990 | Japan . |
| 237643 | 9/1990 | Japan . |
| 2114016 | 7/1983 | United Kingdom . |

OTHER PUBLICATIONS

Attfield et al. "Structural Correlations . . . " J. Solid State Chem. 80, 286–298 (1989).
Attfield, "Ab Initio Structure Determinations of the La Pd Oxides . . . "Acta Cryst. (1988)B44, 563–568.
Kakhan et al. "Synthesis and Properties of . . . LaO–PdO . . . " Russian J Inorg. Chem. 27(8), 1982 p. 1180.
Kato et al. "Lanthanide B–Alumina Supports . . . " in Successful Design of Catalysts, Inui (ed) (1988).
McDaniel et al "Phase relations Between PdO . . . " J of Research of the Nat. B of Standards 72A vol. Jan–Feb 1968.
Muller et al "Synthesis and Crystal Chemistry . . . " in Platinum Group Metals and Compounds, ACS 1970.
Cullis et al Trans. Far. Soc. 8, 1406 (1972).

Primary Examiner—Glenn A. Caldarola
Assistant Examiner—Bekir Li Yildirim
Attorney, Agent, or Firm—Richard A. Negin

[57] ABSTRACT

A catalyst composition containing one or more binary oxides of palladium and rare earth metal such as Ce, La, Nd, Pr and/or Sm. The catalyst composition is used for the catalytic combustion of gaseous combustion mixtures of oxygen and carbonaceous fuels such as methane, e.g., a natural gas/air combustion mixture. Specific preferred binary oxides may be, for example, $M_2O_3 \cdot PdO$ (e.g., $La_2O_3 \cdot PdO$) or $2M_2O_3 \cdot PdO$, wherein in each case M is La, Nd or Sm. A process of combusting gaseous carbonaceous fuels includes contacting a catalyst as described above under combustion conditions, e.g., 925° C. to 1650° C. and 1 to 20 atmospheres pressure, to carry out sustained combustion of the combustion mixture, including catalytically supported thermal combustion. Regeneration of over-temperatured $M_2O_3 \cdot PdO$ catalyst is also provided for.

13 Claims, 1 Drawing Sheet

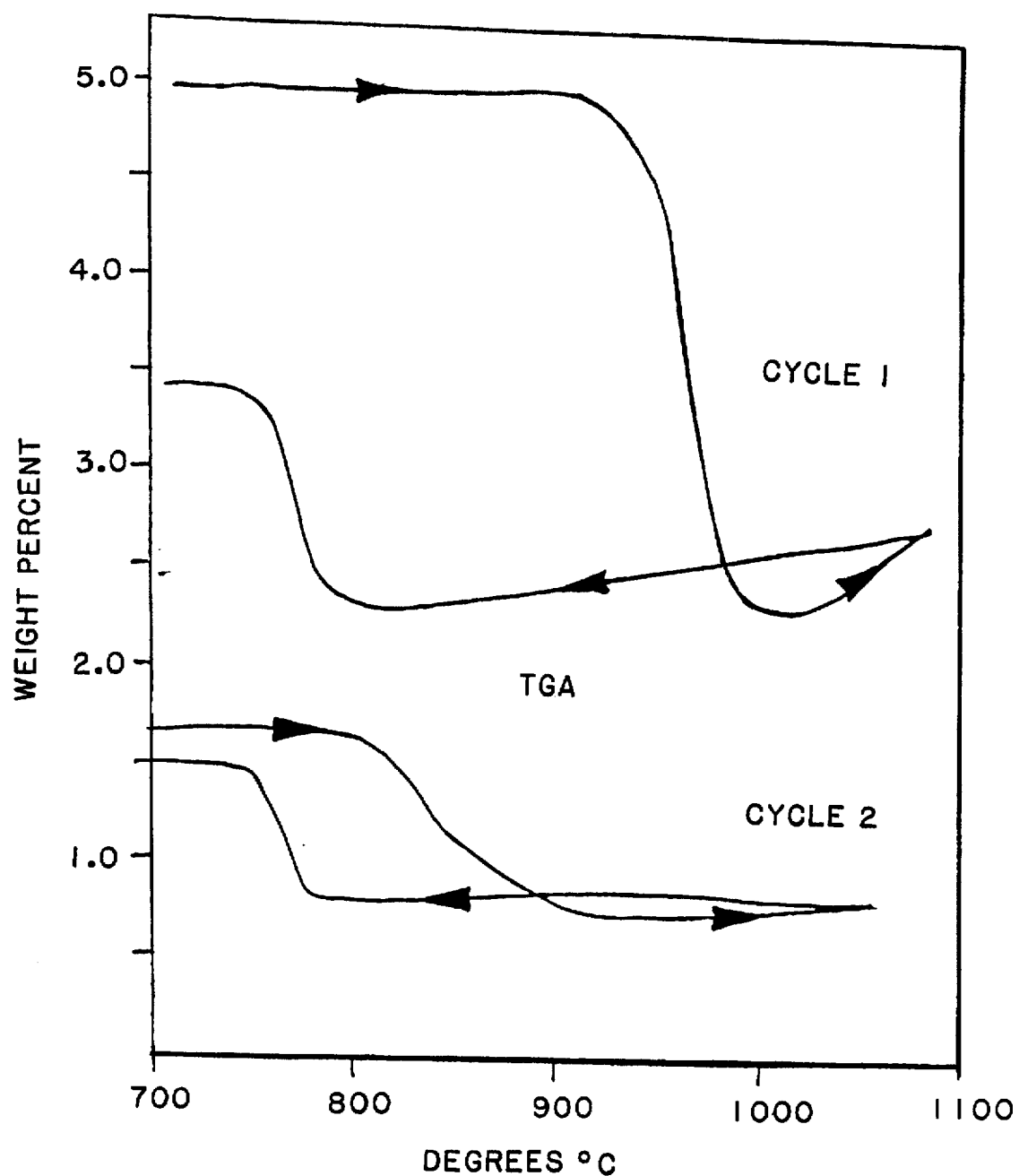

COMBUSTION CATALYSTS CONTAINING BINARY OXIDES AND PROCESSES USING THE SAME

This is a divisional of copending application Ser. No. 07/684,409, filed Apr. 12, 1991.

BACKGROUND OF THE INVENTION

1. Field of the Invention

The present invention relates to catalyst compositions comprising oxides of rare earth metals and palladium which are suitable for the combustion of gaseous carbonaceous fuels such as natural gas or methane, and to a process for catalytic combustion of such fuels using the catalyst compositions.

2. Related Art

Complexes of palladium oxide and rare earth metal sesquioxides are known, as shown by an article by C. L. McDaniel et al, "Phase Relations Between Palladium Oxide and the Rare Earth Sesquioxides in Air", *Journal of Research of the Natural Bureau of Standards—A. Physics and Chemistry*, Vol. 72A, No. 1, January–February, 1968, Pages 27–37 describe complexes of PdO and rare earth metal oxides. Specifically, the paper describes the study of equilibrium phase relations in an air environment between PdO and each of the following sesquioxides: $Nd_2O_3$, $Sm_2O_3$, $La_2O_3$, $Eu_2O_3$, $Gd_2O_3$, $Dy_2O_3$, $Ho_2O_3$, $Y_2O_3$, $Er_2O_3$, $Tm_2O_3$, $Yb_2O_3$ and $Lu_2O_3$. The experimental procedure employed is described in section 3 at page 28 and describes mixing various combinations of PdO and the rare earth metal oxides and subjecting the mixture to preliminary heat treatments for a minimum of 18 hours at 770° C. and then at 780° C. After each heat treatment the materials were examined by x-ray diffraction techniques and following the preliminary heat treatments portions of each batch were fired at various temperatures, typically lying between 1000° C. and 3000° C. as set forth in TABLE I, pages 29–33. Among other findings, the paper notes (in the summary of section 4.3 at page 34) the dissociation temperature of PdO in air at atmospheric pressure to be 800° C.±5° C., and that palladium oxide reacts with a number of the rare earth metal oxides to form binary compounds. What is described as the pseudobinary system $Nd_2O_3 \cdot PdO$ is said to exemplify the typical type of reaction and three binary oxide compounds of, respectively, 2:1, 1:1 and 1:2 ratios of $Nd_2O_3{:}PdO$ are disclosed, viz., $2Nd_2O_3 \cdot PdO$; $Nd_2O_3 \cdot PdO$ and $Nd_2O_3 \cdot 2PdO$. (The compound $2Nd_2O_3 \cdot PdO$ may of course be written as $Nd_4PdO_7$.) Analog compounds are noted for the $Sm_2O_3 \cdot PdO$, $Eu_2O_3 \cdot PdO$ and $La_2O_3 \cdot PdO$ systems, with only the 2:1 and 1:2 compounds occurring in the latter system. However, it was noted that other rare earth oxide-palladium oxide combinations did not react in the solid state. There were combinations of PdO with, respectively, $Ho_2O_3$, $Y_2O_3$, $Er_2O_3$, $Tm_2O_3$, $Yb_2O_3$ and $Lu_2O_3$. (See the Abstract at page 27, and the last sentence on page 35.)

Another article, by A. Kato et al, "Lanthanide B-Alumina Supports For Catalytic Combustion Above 1000° C.", *Successful Design of Catalysts*, 1988 Elsevier Science Publishers, pages 27–32, describes the preparation of support materials consisting of lanthanide oxides and alumina for use as combustion catalysts. The article states that endurance tests on methane combustion performed at 1200° C. proved that a Pd catalyst supported on lanthanum beta-alumina has good resistance to thermal sintering (page 32).

An English language abstract of Japanese Patent Publication J 63088041 (1988) Tsuj et al, Tanaka Kikinzoku Kogyo discloses a catalyst consisting of a ceramic support composed of alumina on whose surface Pd and/or PdO is supported on a layer of intermetallic PdM or PdMO wherein M is a rare earth metal. The disclosed use is for catalyzing combustion of fuel without generation of nitrogen oxides. Chemical Abstracts (CA 109 11 32 93 k) identifies the patentee as Tanaka Noble Metal-Industrial Co. Ltd. and describes the methane combustion catalyst as Pd—Pd/LaO$_2$ on gamma-alumina and reports that this catalyst combusted natural gas at an inlet temperature of 355° C. with 100% efficiency after 1 hour and with 99.98% efficiency after 1,000 hours.

U.S. Pat. No. 4,893,465 issued to Robert J. Farrauto et al describes a process for the catalytic combustion of carbonaceous materials, such as natural gas or methane, using a palladium oxide containing catalyst. In the process, the palladium oxide catalyst for the catalytic combustion is subjected to temperatures in excess of the decomposition temperature of palladium oxide to metallic palladium, the latter being inactive for catalysis of the combustion reaction. At atmospheric pressure the decomposition temperature of PdO is at least about 800° C. The stated improvement in the process of the Patent comprises restoring catalytic activity by lowering the temperature of the catalyst to a regenerating temperature, i.e., a temperature at which Pd is oxidized to PdO, which in air at atmospheric pressure is from about 530° C. to about 650° C., and maintaining the temperature within that range until desired catalytic activity is achieved by re-oxidation of catalytically inactive Pd to PdO. The examples of the Patent utilize $PdO/Al_2O_3$ as the catalyst.

U.S. Pat. No. 4,893,465 to Farrauto et al dated Jan. 16, 1990 describes a process for the catalytic combustion of carbonaceous materials, such as natural gas or methane, using a palladium oxide containing catalyst. In the process, the catalyst for the catalytic combustion is subjected to temperatures in excess of the decomposition temperature of the catalyst, which at atmospheric pressure is at least about 800° C., the improvement in the process comprises restoring catalytic activity by lowering the temperature of the catalyst into a regenerating temperature which at atmospheric pressure is from about 530° C. to about 650° C. and maintaining the temperature within the range until desired catalytic activity is achieved. The examples utilize $PdO/Al_2O_3$ as the catalyst.

SUMMARY OF THE INVENTION

In accordance with the present invention, there is provided a catalyst composition comprising a refractory carrier on which is dispersed a catalytic material comprising a mixture of a refractory inorganic binder (e.g., one or more of silica, alumina, titania and zirconia) and a binary oxide of palladium and a rare earth metal. The rare earth metal may be one or more of Ce, La, Nd, Pr and Sm. For example, in one aspect of the invention the binary oxide has the formula $2M_2O_3 \cdot PdO$, where M is one or more of La, Nd and Sm; in another aspect of the invention, the binary oxide has the formula $M_2O_3 \cdot PdO$, where M is one or more of La, Nd and Sm, e.g., $La_2O_3 \cdot PdO$.

In another aspect of the invention the binary oxide is contained in a reaction product obtained by heating a reaction mixture of palladium oxide and a rare earth metal oxide to an elevated temperature for a time sufficient to react at least a portion of the palladium and rare earth metal oxides to form the binary oxide. In one embodiment of this aspect of the invention, the reaction mixture comprises a mixture in the proportion of about two moles of $M_2O_3$ to one mole of PdO and the reaction product contains the binary oxide having the formula $2M_2O_3 \cdot PdO$, where M is one or more of La, Nd and Sm. Another embodiment of this aspect of the invention provides as the reaction mixture a mixture in the proportion of about one mole of $La_2O_3$ to one mole of PdO and the reaction product contains $La_2O_3 \cdot PdO$ as the reaction product.

The invention provides in certain aspects thereof that the carrier comprises a body having a plurality of parallel gas flow passages extending therethrough, the passages being defined by walls on which the catalytic material is disposed as a coating, i.e., as a "washcoat".

A process aspect of the invention provides a process for the catalytically supported combustion of a gaseous carbonaceous fuel. The process comprises the steps of forming a gaseous combustion mixture comprising the fuel and oxygen, for example, a mixture of natural gas or methane and air, and contacting the combustion mixture in a catalyst zone with a catalyst composition. The catalyst composition comprises a refractory carrier on which is disposed a catalytic material comprising a mixture of a refractory inorganic binder (e.g., one or more of silica, alumina, titania and zirconia) and a binary oxide of palladium and a rare earth metal selected from the group consisting of one or more of Ce, La, Nd, Pr and Sm. The contacting is carried out under conditions in the catalyst zone, e.g., a temperature of from about 925° C. to 1650° C. and a pressure of about 1 to 20 atmospheres, which are suitable for catalyzed combustion of the combustion mixture, so that sustained combustion of at least a portion of the fuel in the mixture is thereby effected. A narrower range of suitable combustion conditions may be maintained in the catalyst zone, for example, a temperature of about 1000° C. to 1500° C. and a pressure of about 1 to 15 atmospheres.

In another process aspect of the invention, the catalyzed combustion is carried out under substantially adiabatic conditions at a reaction rate exceeding the mass transfer rate of gaseous fuel and oxygen to the catalyst, to attain catalytically supported thermal combustion of at least a portion of the fuel without any substantial formation of oxides of nitrogen.

In another aspect of the present invention, there is provided a process for regenerating a catalyst composition comprising a refractory carrier on which is disposed a catalytic material comprising a mixture of (i) a refractory inorganic binder and (ii) a catalytically effective amount of a binary oxide having the formula $M_2O_3 \cdot PdO$ wherein M is selected from the group consisting of one or more of La, Nd and Sm (e.g., the binary oxide may be $La_2O_3 \cdot PdO$) and which has sustained deactivation caused by being heated to a temperature above its deactivation temperature. The regeneration comprises heating the catalyst composition in the presence of an oxygen-containing gas at a regeneration temperature of about 790° C. or less, e.g., in the range of from about 700° C. to 790° C. The oxygen-containing gas may be air.

Other aspects of the invention provide using as the catalyst composition the compositions described above, and still others aspects of the invention are described below.

BRIEF DESCRIPTION OF THE DRAWING

The sole FIGURE is a plot of a thermogravimetric analysis ("TGA") in air of a sample of a reaction product containing the binary oxide $La_2O_3 \cdot PdO$ of the invention, showing temperature versus sample weight and illustrating weight changes associated with decomposition of the compound to catalytically inactive species and regeneration of the catalytically inactive species to catalytically active $La_2O_3 \cdot PdO$.

DETAILED DESCRIPTION OF THE INVENTION AND PREFERRED EMBODIMENTS THEREOF

There is interest in using gaseous carbonaceous fuels such as natural gas or other carbonaceous fuels for various applications, including fueling gas turbines. Natural gas is a mixture of low molecular weight paraffin series hydrocarbons such as methane, ethane, propane and butane with small amounts of higher hydrocarbons, with methane almost always being the major constituent. Other suitable fuels include ethane, propane, butane, other hydrocarbons, alcohols, other carbonaceous materials, and mixtures thereof. Thermal combustion of gaseous carbonaceous fuels such as natural gas and/or other carbonaceous fuels takes place at high temperatures, in excess of 1650° C., where NOx formation occurs by oxidation of atmospheric nitrogen in the combustion air. The use of a catalyzed combustion process which operates at lower temperatures than a flame combustion process, for example, within a temperature range of about 925° C. to 1650° C., would significantly reduce or eliminate the formation of nitrogen oxides. However, the most prevalent gaseous carbonaceous fuel is natural gas. Combusting methane, which is the predominant component of natural gas, is difficult because one of the steps in the oxidation of methane is the cleavage of a C—H bond which is more difficult to accomplish in methane than cleavage of either C—H or C—C bonds of higher carbon number hydrocarbons. Therefore, catalysts which are active for oxidation of higher carbon number hydrocarbons may not be active, or sufficiently active, for oxidation of methane or methane-containing gases. Further, the catalysts employed for catalytic combustion of carbonaceous gases must also remain active at the temperatures to which they are exposed during catalyzed combustion. Catalytic combustion temperatures may range, as noted above, from about 925° C. to 1650° C. More usually, the range is about 1000° C. to 1500° C., but the temperature to which a given segment of catalyst is exposed must be controlled to below the decomposition temperature of the catalyst. For example, palladium oxide (PdO) shows excellent activity for such catalytic combustion but, at atmospheric pressure, is deactivated at a temperature of about 800° C. or so. References herein and in the claims to decomposition and regeneration temperatures of the various binary oxide catalytic species are all at atmospheric pressure, it being understood that at enhanced partial pressure of oxygen the decomposition and regenerating temperatures will shift upwardly. The determination of such increased temperatures at higher oxygen partial pressures will be a matter well known to those skilled in the art. Thus, the above stated temperature ranges are dependent on the partial pressure of oxygen, and at higher pressures, as for example might be encountered in conjunction with generation of combustion effluent useful for operation of gas turbines, the decomposition temperatures of the binary oxide species will increase, as will the regeneration temperature at which they will re-form.

The present invention provides a catalyst composition comprising one or more binary oxides of palladium and rare earth metal: such catalyst compositions have been found to be highly heat resistant as compared to PdO. Although such binary oxides are less active than PdO, their ability to operate at temperatures much higher than the 800° C. deactivation temperature of PdO is advantageous. Further, if such binary oxide catalysts are accidentally exposed to temperatures high enough to inactivate them, some of them can be regenerated, in some cases, at relatively high temperatures. These characteristics make the binary oxides used in the present invention extraordinarily useful as catalysts for catalytic combustion of carbonaceous gases, especially methane and methane-rich gases such as natural gas.

The binary oxide catalysts of the present invention may be prepared by either a dry mixed-oxide method or a solution-drying method. In the dry mixed-oxide method an oxide of a rare earth metal, for example, one selected from the group consisting of one or more of Ce, La, Nd, Pr and Sm, is mixed with palladium oxide in selected weight ratios. The mixture is mechanically ground to a size range of about 50 to 100 micron diameter particles. The grinding is followed by calcination in air, for example, at a temperature of about 1100° C. for about 66 hours, to provide a reaction mixture containing the binary oxide of palladium and rare earth metal of the invention. Preferably, the rare earth metal oxide and palladium oxide starting materials are mixed in stoichiometric proportions to produce the desired compound. Thus, the molar ratio of the rare earth metal oxide (e.g., $M_2O_3$, where M is Ce, La, Nd, Pr or Sm) to PdO in the reaction mixture may be 2:1, 1:1 or 1:2 molar ratios of $M_2O_3$ to PdO. Although it is not necessary to use the starting materials in the molar ratios of the desired binary oxide product, the use of such stoichiometric proportions has been found to be advantageous particularly with respect to the preparation of the $2M_2O_3.PdO$ compounds as discussed in more detail below.

In the solution-drying method, suitable amounts (preferably the same 2:1, 1:1 or 1:2 molar ratios) of a nitrate or other suitable soluble compound of the rare earth metal and a suitable, soluble palladium salt such as palladium nitrate, $Pd(NO_3)_2.2H_2O$, are mixed in an aqueous solution at, for example, temperatures of between about 60° C. and 90° C., and heated to evaporate to dryness. The resulting residue is calcined in air, for example, at temperatures from 500° C. to about 1100° C. for about 2 to 18 hours to provide a reaction mixture containing the binary oxide of the invention.

The use of x-ray diffraction analysis showed the presence in the reaction products of both the dry mixed-oxide and solution-drying methods of the desired binary oxide of palladium and the rare earth metal.

The physical configuration of a catalyst composition of this invention may utilize as a carrier a structure comprising a ceramic substrate on which is disposed a coating of a catalytic material, conventionally referred to as a "washcoat". In the case of the present invention the washcoat is comprised of the binary oxide catalyst and a suitable refractory binder. The ceramic substrate body is usually cylindrical in shape and has a plurality of fine gas flow passages extending therethrough, from an inlet to an outlet face of the body, to provide a somewhat honeycomb-type structure. The gas flow passages (sometimes referred to as "cells") in the honeycomb structure are substantially parallel and defined by thin walls, and may be of any desired cross section such as square, other rectangular, triangular or hexagonal shape. The number of channels per square inch of face surface may vary, depending upon the particular application for which the catalyst composition is to be used. Such honeycomb-type carriers are commercially available having anywhere from about 9 to 600 cells per square inch. The substrate or carrier (which is loosely referred to as "ceramic" and may be made of cordierite, mullite, silica, alumina or any such suitable material) desirably is porous and may (but need not) be relatively catalytically inert to the combustion reaction as compared to the binary oxide(s) used in the invention. The catalyst compositions of the present invention may be prepared according to known preparation techniques, viz, the catalytic material containing the binder and binary oxides is applied to the carrier by dipping the carrier into an aqueous slurry of fine particles of the catalytic material, in order to coat the gas flow passage walls. Excess slurry is removed, e.g., by blowing it out of the gas flow passages with compressed air, and the coated structure is dried and then calcined in air at temperatures of about 500° C. for about 2 hours to provide an adherent "washcoat" of catalytic material on the walls defining the gas flow passages.

Two classes of rare earth metal-palladium binary oxides which have been found to be particularly useful in the practices of the invention are those having the formulas, respectively, $M_2O_3.PdO$ and $2M_2O_3.PdO$, wherein in both cases M is selected from the group consisting of one or more of La, Nd and Sm. These catalysts display good activity for catalyzing the combustion of carbonaceous gases, including methane, the most difficult to combust of the carbonaceous gases normally utilized as combustion fuels. The binary oxides $M_2O_3.PdO$, e.g., $La_2O_3.PdO$, initially decompose to catalytically inactive species at about 955° C. but after being aged for several heating and cooling cycles, display a decomposition onset temperature and a regeneration onset temperature of about 790° C. The near co-incidence of the decomposition and regeneration onset temperatures substantially eliminates the hysteresis or "dead zone" gap between catalytically active $M_2O_3.PdO$ and catalytically inactive species. This greatly facilitates regeneration of catalysts which are accidentally inactivated by inadvertent over-temperature operation. On the other hand, whereas the binary oxides $2M_2O_3.PdO$ as a practical matter are not significantly regenerable once they have decomposed, they do not decompose to catalytically inactive species until temperatures well in excess of 1200° C. are reached.

The features and advantages of certain embodiments of the present invention are illustrated with respect to the following non-limiting Examples.

EXAMPLE 1

A. A stoichiometric mixture of two moles of lanthanum oxide ($La_2O_3$) and one mole of palladium oxide (PdO) powder was ground to a fine particle size, calcined in air at 780° C. for 17 hours, reground, and calcined in air for an additional 66 hours at 1100° C., then ground again to a final particle size of about 100 to 150 microns in diameter to provide a powder of the binary oxide $2La_2O_3.PdO$. A binder comprising alumina sold under the trade name Catapal by Vista Company was prepared by calcining the alumina in air at 950° C. for 2 hours to reduce its surface area, thereby pre-stabilizing it against thermal deactivation, and then grinding in a ball mill a slurry of the calcined alumina at 45% solids in an aqueous medium with 2.25 weight percent acetic acid. The grinding was continued to a viscosity of 40 to 50 centipoise to provide a particle size of the alumina in the range of less than about 20 microns diameter. The resultant alumina binder and the $2La_2O_3.PdO$ powder were mixed to form an aqueous slurry in a proportion of 93 percent by weight alumina binder and 7 percent by weight $2La_2O_3.PdO$, dry basis. The finished washcoat slurry was applied to a series of ceramic carrier bodies made of cordierite, each being 1 inch in diameter, 1 inch long and having 400 cells per square inch. This was accomplished by dipping each carrier into the slurry, draining off excess slurry, and allowing the thus-coated carrier to dry overnight at 120° C. The carriers were then calcined in air at 500° C. for 2 hours to provide an adherent washcoat of catalytic material on the carrier. Typically, the resulting catalyst bodies contained 2.5 grams of washcoat per cubic inch of volume, which provided 0.175 g of 2La$_2$O$_3$.PdO per cubic inch of catalytic body.

B. Slurries of three more binary rare earth metal-palladium oxides and one comparative material using PdO in place of the binary oxide were prepared according to the procedure of part A of this Example 1. In all, three different binary oxides as set forth in TABLE I below were prepared, as was a comparative catalyst which was coated with the gamma alumina binder and 1% by weight (of the weight of the washcoat) of PdO. The PdO was provided by Engelhard Corporation and was 86% by weight Pd, as PdO. The catalyst bodies containing the binary oxides of the invention each had an equivalent PdO content of 1% by weight of the weight of the washcoat, the PdO existing as part of the binary oxide compound in the case of the catalysts of the invention.

C. The activity of all three of the catalysts was tested for methane combustion by passing a gaseous stream of 1 volume percent CH$_4$ in air at ambient pressure through each of the catalyst samples. A flow rate 20 liters per minute measured at standard temperature and pressure was maintained, resulting in a space velocity of 1,350,000 hours$^{-1}$. During each test the temperature of the inlet gas was gradually increased by externally heating the bed and a Beckman Industrial Model 400A Hydrocarbon Analyzer monitored the conversion of CH$_4$ as a function of temperature. As a measure of activity of the catalyst, the temperature at which conversion of 20% of the inlet methane occurred was taken. TABLE I lists the temperatures at which the 20% conversion was reached for each catalyst composition.

TABLE I

| Sample No. | Catalyst | Temperature, °C. |
| --- | --- | --- |
| 1 | 2La$_2$O$_3$.PdO | 463 |
| 2 | 2Nd$_2$O$_3$.PdO | 512 |
| 3 | 2Sm$_2$O$_3$.PdO | 622 |
| 4 (Comparative) | PdO | 389 |

The data of TABLE I shows that the catalyst compositions comprising the binary oxides of the present invention provide catalysts which have acceptable activity, although clearly not as good as PdO. Thus, the PdO-containing comparative catalyst of Sample 5 required an inlet temperature of only 389° C. to attain 20% conversion of inlet CH$_4$. However, the activity for catalyzed combustion of Samples 1–3 in accordance with embodiments of the present invention is well within acceptable operating temperature ranges for catalytic combustion. Sample 1 (2La$_2$O$_3$.PdO) shows the best activity of the catalysts exemplifying the invention, with a temperature of 463° C. being required to attain 20% conversion of CH$_4$, with the activities of Samples 2 (2Nd$_2$O$_3$.PdO) and 3 (2Sm$_2$O$_3$.PdO) showing 20% conversion at 512° C. and 622° C., respectively. Although operation at temperatures of in excess of about 800° C. at atmospheric pressure will cause PdO to deactivate into a catalytically inactive species, the binary oxide compounds of the present invention are stable at much higher temperatures, thereby permitting operation of the catalyst at well above 800° C., but still below the 1300° C. or 1400° C. temperatures at which significant nitrogen oxides are generated. This is clearly advantageous as the higher temperatures permit greater efficiencies of operation.

Thus, the binary oxides of the present invention are stable at temperatures of up to about 1200° C., enabling operation at about 400° C. higher temperature than is attainable with PdO catalysts. For example, a catalyst composition containing 2La$_2$O$_3$.PdO is well suited for use in a staged catalytic combustion device as a higher temperature stage catalyst, because thermal decomposition of this catalyst occurs only at a temperature above about 1200° C.

EXAMPLE 2

The compounds 2Nd$_2$O$_3$.PdO and 2La$_2$O$_3$.PdO were prepared in accordance with the method of Example 1. These materials were tested for stability in air by thermogravimetric analyses carried out by measuring small weight changes in a sample of the reaction product occurring at different temperatures during a heating and cooling cycle. The weight changes are caused by various chemical reactions and phase changes undergone by the samples. A carefully weighed sample of 20 milligram ("mg") to 50 mg size is placed in a quartz pan which is suspended from a weight measuring device manufactured by Thermal Sciences, Model STA 1500. Air at approximately 20 cm$^3$/min is passed over the sample. A furnace gradually heats the sample at a rate of about 10° C./min and weight changes occasioned by the heating are noted to show the weight losses which result from decomposition of the compound and consequent loss of oxygen. The heating was continued until a temperature of 1400° C. was attained. In addition to the weight changes, temperature changes caused by the heat of reaction (differential thermal analysis) of the sample as decomposition takes place were monitored during the heating period.

The results of the thermogravimetric analyses of the catalysts show stability of the compounds to be as follows:

| Compound | Onset of Decomposition °C. |
| --- | --- |
| 2Nd$_2$O$_3$.PdO | 1230° C. |
| 2La$_2$O$_3$.PdO | 1300° C. |

The thermogravimetric analyses of Example 2 indicated that the tested 2M$_2$O$_3$.PdO compounds are thermally stable in air at atmospheric pressure up to the indicated temperatures, well above 1200° C. When heated to the indicated decomposition temperatures, the catalytically active binary oxide compounds 2M$_2$O$_3$.PdO are decomposed and the result is formation of a catalytically inactive species. The thermal stability and catalytic activity of the 2M$_2$O$_3$.PdO compounds for oxidation of carbonaceous gaseous fuels, makes these compounds and reaction mixtures containing one or more of them well suited for practical use in catalytic combustion processes for carbonaceous gaseous fuels. For example, by way of comparison, PdO decomposes to an inactive species at about 800° C., more than 400° C. below the decompostion temperatures of the 2M$_2$O$_3$.PdO binary oxides.

EXAMPLE 3

A. A catalytic combustion system was prepared as follows with two sections of catalyst, a first or upstream section positioned to be first contacted by the flowing gaseous combustion mixture stream, and a second or downstream section being last contacted by the flowing gaseous stream.

B. The first section was a catalyst body provided by a cordierite honeycomb having 400 cells per square inch of end face and being 1 inch (2.54 cm) in diameter, and 4 inches (10.2 cm) long and coated with alumina washcoat containing 8% PdO by weight of the dried, calcined washcoat.

C. The second section was a catalyst body provided by a honeycomb made of silica-alumina-magnesia fibers and of the same overall dimensions as used for the first section, but with 64 cells per square inch, coated with a washcoat of alumina mixed with $2La_2O_3 \cdot PdO$ particles and having a content of 1% by weight PdO equivalent contained in the binary oxide.

D. The combustion of methane was measured under the following conditions. A gaseous stream containing about 4% by volume methane in air was flowed at a velocity of 50 feet per second and at three atmospheres pressure in sequence through the first and second catalyst bodies. At an inlet temperature of 480° C., combustion of methane was complete, unburned hydrocarbons and oxides of nitrogen emissions were below 2 parts per million ("ppm").

The results of Example 3 show that a catalyst composition in accordance with the invention may be utilized as a downstream catalyst in combination with an upstream catalyst comprised of a more active catalyst such as PdO. It is seen that the upstream or inlet portion of the catalytic system operates at a lower temperature than does the downstream portion. Consequently, a more active catalyst but one which decomposes at relatively low temperatures (such as a PdO catalyst) may be used in the cooler upstream section whereas a catalyst, such as those provided by the binary oxides of the present invention, which is more resistant to high temperature may be used in the downstream or higher temperature portions of the catalyst. Since the downstream section is contacted by the higher temperature gases emerging from the upstream section, the lower activity of the high temperature resistant catalyst of the invention is nonetheless adequate to catalyze combustion of the fuel at the higher, downstream temperatures involved.

EXAMPLE 4

To ascertain the efficiency of the $2La_2O_3 \cdot PdO$-containing catalyst composition, a comparative test was made with an arrangement similar to that used in Example 3, except that the last 2 inches (as sensed in the direction of gas flow through the catalyst bodies) of each catalyst body tested was provided in one case with a washcoat containing the $2La_2O_3 \cdot PdO$/alumina mixture as in Example 2, and in the comparative case with a washcoat of alumina without the binary oxide or any other combustion catalyst. The data are given in the following TABLE II.

At an inlet temperature of 475° C., the total temperature increment over the entire bed was 335° C. and the temperature increment over the last 2 inches was 200° C. in the case of $2La_2O_3 \cdot PdO$-containing washcoat. No unburned hydrocarbons ("UHC") were detected in the effluent from this catalyst body. The NOx content of the effluent was less than 1 ppm.

For the control or comparative catalyst body containing the alumina washcoat without the $2La_2O_3 \cdot PdO$ catalyst, the inlet temperature was 480° C. and the total temperature increment was 200° C., unburned hydrocarbons was 2.8% and NOx was less than 1 ppm. The comparison shows that the $2La_2O_3 \cdot PdO$ segment was an effective catalyst for combustion of methane.

TABLE II

|  | Comparative Sample | Exemplary Catalyst Sample |
|---|---|---|
| Gas Inlet Temp. (°C.) | 480 | 475 |
| Fuel, Vol % $CH_4$ | 4 | 4.1 |
| Bed Temp. Increment, (°C.) | 200 | 335 |
| Bed Temp. Increment, last 2 inches (°C.) | N/A | 200 |
| UHC in Effluent | 2.8% | ND |
| NOx in Effluent | <1 ppm | <1 ppm |

UHC = unburned hydrocarbons
NOx = nitrogen oxides
N.D. = not detected
N/A = not available The efficacy of the binary oxide catalyst of the present invention is shown by the much higher bed temperature attained as compared to the control sample, indicating that the combustion process was carried out to a far greater extent in the exemplary catalyst than in the control sample. Note also that the unburned hydrocarbons in the effluent from the control sample was 2.8 volume percent whereas no unburned hydrocarbons were detected in the effluent from the exemplary catalyst sample in accordance with the present invention, despite the fact that the change in temperature was only 335° C. across the exemplary catalyst bed. This modest temperature increment for a 4% $CH_4$ in air gas mixture in conjunction with the substantial elimination of hydrocarbons from the effluent clearly indicates that a portion of the methane was thermally combusted downstream of the catalyst bed. It is therefore seen that the objective of catalytically supported thermal combustion was attained. Note also that less than 1 ppm nitrogen oxides was detected in the effluent from the exemplary catalyst sample despite the fact that all detectable amounts of hydrocarbons were combusted.

EXAMPLE 5

To illustrate the effectiveness of $2La_2O_3 \cdot PdO$ for methane combustion, its performance was compared to a blank alumina washcoated honeycomb. Two catalyst bodies measuring 1 inch in diameter by 8 inches in length were prepared. The first 6 inches of each body was the same and comprised PdO on alumina catalyst, coated onto a 64 cell per square inch alumina-silica-magnesia fiber honeycomb type support. The last 2 inches of a comparative sample was provided with a plain alumina washcoat, while the last two inches of an exemplary catalyst composition was provided with about 1.5 g/in³ of a washcoat containing about 7 weight percent of the catalytic species $2La_2O_3 \cdot PdO$, balance (93 weight percent) alumina. The conversion of a combustion mixture comprising 4 volume percent methane in air was measured in a pilot reactor under three atmospheres pressure and 50 ft per second linear velocity of gas flow measured at inlet temperature and pressure. The comparative reactor containing the alumina blank showed a temperature increase of 200° C. across the reactor with an inlet gas temperature of 475° C. The exemplary reactor containing $2La_2O_3 \cdot PdO$ produced a temperature increase of 350° C. across the reactor under the same inlet gas conditions. The 150° C. greater increase in temperature across the exemplary reactor as compared to the comparative reactor is due to improved combustion induced by the $2La_2O_3 \cdot PdO$ catalyst. The exemplary catalyst, comprising only 25% of the length of the bed, induced a 75% improvement in overall efficiency of combustion as compared to a reactor in which 25% of the bed was comprised of a blank alumina catalyst. The exemplary catalyst also supported combustion of methane at close to 100% efficiency with an effluent containing less than 5 ppm unburned hydrocarbons and less than 2 ppm nitrogen oxides, while operating under catalytically-supported thermal combustion conditions of the type described below with reference to Pfefferle U.S. Pat. No. 3,928,961. As with the test of Example 4, the relatively modest temperature increment across the exemplary reactor and the exceedingly low level of hydrocarbons in the effluent clearly indicates that desired catalytically supported thermal combustion was attained, i.e., hydrocarbons were combusted downstream of the catalyst.

EXAMPLE 6

Preparation of $La_2O_3.PdO$ by the Solution Drying Method

Aqueous solutions of 27.55 g of $Pd(NO_3)_2.2H_2O$ and 22.50 g of $La(NO_3)_3.6H_2O$ were slowly mixed in a beaker with stirring to give a solution containing a 1:1 molar ratio of La to Pd. The beaker was in an oil bath kept at a temperature between 94° C. and 98° C. The temperature of the bath was raised to 110° C. and held at that temperature until the mixed solution evaporated to dryness. The dried residue was put into a crucible and placed in a muffle oven set at a temperature of 100° C. which was then raised to 500° C. The residue mixture was kept in the oven at 500° C. for 17.5 hours. After cooling, the mixture was ground into a fine powder in a mortar using a pestle, to yield a reaction product containing $La_2O_3.PdO$.

EXAMPLE 7

Testing of the Catalysts Prepared by the Procedure of Example 6

The binary oxide catalyst prepared by the procedure of Example 6 was tested in a laboratory reactor. The catalyst in powder form was in one case (Part 1 of TABLE III) mixed with alpha alumina particles to provide a mixture containing 2% by weight of the reaction product of Example 6 and 98% by weight alumina. In Part 2 of TABLE III, the catalyst powder alone was used. In both cases, the powder was placed into a quartz tube reactor in which the catalytic material mixture was supported by a fritted quartz disc. The inlet combustion mixture test gases used were 1 volume percent or 0.1 volume percent methane in air. The measure of activity is the temperature at which 20% of the methane in the inlet combustion gas had been oxidized. Tests were run on both fresh and aged catalyst samples and, for comparison, tests were run on beds of alumina only and with the quartz tube empty. The results attained are set forth in TABLE III.

TABLE III

| Sample | Activity Data Temperature (°C.) at Which 20% Conversion of $CH_4$ is Attained |
|---|---|
| 1. Conditions: 1.5 liters per minute of 1% $CH_4$ in air, 0.06 g catalyst/2.94 g $Al_2O_3$. | |
| $La_2O_3.PdO^{(a)}$ | 574 |
| $La_2O_3.PdO^{(b)}$ | 605 |
| $Al_2O_3$ only | 660 |
| Empty tube | 721 |
| 2. Conditions: 1 g of $La_2O_3.PdO$ product, 0.3 liters per minute of 0.1% $CH_4$ in air. | |
| $La_2O_3.PdO/Al_2O_3$ | 420 |
| Empty tube | 695 |

(a) = Fresh sample
(b) = After 17 hours of operation at 1100° C.

TABLE III shows that the activity of the fresh catalyst was still acceptable after exposure of the catalyst to 1100° C. for 17 hours, even though the test was run at a high space velocity of 1,500,000 $hrs^{-1}$.

Generally, the data of TABLE III shows the effectiveness of the reaction product containing the binary oxide $La_2O_3.PdO$ as a catalyst for combustion of dilute mixtures of methane in air.

EXAMPLE 8

A. In order to evaluate the decomposition and regenertion temperatures of the catalyst, samples were prepared in accordance with the technique of Example 6.

B. The resulting samples were subjected to decomposition temperatures and then treated at lower temperatures in an attempt to regenerate the catalyst. Thermogravimetric analysis as described in Example 2 was employed to ascertain decomposition and regeneration temperatures.

In order to test the regeneration temperature, after the heating cycle was completed to attain and ascertain the decomposition temperature, heating was discontinued to allow the heated sample to cool in air and changes in weight and temperature changes caused by heats of reaction due to chemical (re-oxidation) and/or phase changes were monitored during the cooling period.

Referring now to the sole FIGURE of the drawing there is shown a graph on which percentage change in weight of the sample subjected to thermogravimetric analysis is plotted on the abscissa versus the temperature in degrees Centigrade to which the sample is exposed plotted on the ordinate. A carefully weighed sample of 20 to 50 mg by weight of the reaction material obtained in Example 6 was placed in a quartz pan which was suspended from a weight measuring device manufactured by Thermal Sciences, Model STA 1500. Air at approximately 20 $cm^3$/min was passed over the sample while a furnace gradually heated the sample at a rate of about 10° C./min to attain the temperature shown on the abscissa of the graph of the sole FIGURE of the drawing. The weight changes of the sample occasioned by the heating are plotted as the percentage change in weight, based on the weight of the unheated sample, on the abscissa of the chart of the FIGURE. These show the changes in weight which result from decomposition of the $La_2O_3.PdO$ compound and consequent loss of oxygen and weight gains occasioned by re-oxidation of the rare earth oxide $La_2O_3.PdO$ with consequent gain of oxygen and weight. When the desired temperature is attained the heating was discontinued to allow the heated sample to cool in air and resultant changes in weight due to chemical reaction, such as re-oxidation to reconstitute the $La_2O_3.PdO$ compound were monitored during the cooling period.

With reference now to the FIGURE, the initial heating of the reaction product obtained in Example 6 is indicated by the curve labelled "Cycle 1". The heating period is indicated by the arrowheads directed rightwardly as viewed in the FIGURE. While being heated from about 700° C. to over 900° C., the weight of the sample remained essentially unchanged but a precipitous loss in weight occurred starting at about 932° C., indicating a decomposition of the $La_2O_3.PdO$ compound, and possibly other binary oxides contained in the reaction mixture. Upon further heating to attainment of a temperature of about 1080° C., heating was stopped and the sample was allowed to cool in air, resulting in a further loss in weight until a temperature of about 790° C. was attained, wherein a pronounced increase in weight occurred with cooling between about 790° C. to about 700° C. In a second heat cycle of the same sample, identified as "Cycle 2" in the FIGURE, it is seen that upon conducting a second thermogravimetric test analysis of the same sample, a significant weight loss is noted at about 820° C. and stabilizes at about 920° C. Upon further heating to about 1060° C., the weight remained fairly stable. Upon being allowed to cool the weight remained fairly stable until a temperature of about 790° C. was attained wherein a significant weight increase attributed to re-oxidation of the palladium oxide species to form catalytically active $La_2O_3.PdO$ is noted; the weight gain stabilized at about 750° C. It will be noted that in Cycle 2, a much greater degree of recovery is attained than in Cycle 1. That is, a much higher proportion of the catalytically active species initially present is recovered by cooling to somewhat below 800° C. The data for continued cycling of the material is shown in TABLE IV.

TABLE IV

| Cycle | Decomposition[1] | | | Regeneration | | |
|---|---|---|---|---|---|---|
| | Wd | % Wd | Td | Wr | % Wr | Tr |
| 1 | .70 | 2.28 | 955 | .16 | .52 | 780 |
| 2 | .20 | .65 | 790 | .17 | .55 | 769 |
| 3 | .24 | .78 | 870 | .18 | .58 | 790 |
| 4 | .22 | .71 | 790 | .17 | .55 | 790 |
| 5 | .21 | .68 | 790 | .16 | .52 | 790 |

[1]Maximum heating profile temperature = 1100° C.
Wd = Weight loss of sample during heating cycle, milligram.
% Wd = Weight loss of sample, as percent by weight of original weight of sample.
Td = Temperature in °C. at which decomposition takes place.
Wr = Weight gain upon cooling.
% Wr = Weight gain of sample, as percent by weight of decomposed sample.
Tr = Temperature in °C. at which weight gain takes place.

Table IV shows that for temperatures less than 1100° Centigrade, while some $La_2O_3.PdO$ is lost on the initial cycle due to sintering and/or phase changes, some of the catalytically active material is regenerated at a reasonably high temperature By the time the third cycle is attained, a steady state is achieved and the hysteresis between decomposition and regeneration of the binary oxide species has been substantially eliminated. The absence of hysteresis, i.e., the fact that the compound will commence to regenerate at substantially the same temperature at which it initially commenced to decompose, substantially eliminates the hysteresis or "dead zone" in which the material is a catalytically inactive species. For example, the palladium oxide catalyst disclosed in U.S. Pat. No. 4,893,465 will, at atmospheric pressure, decompose at a temperature of about 810° C. and will not regenerate until cooling to a temperature of about 650° C. is attained, resulting in a 160 degree hysteresis temperature range (between 650° C. and 810° C.) in which the material is substantially catalytically inactive. The aged $La_2O_3.PdO$ binary oxide, by substantially eliminating this hysteresis or "dead zone" provides extremely rapid recovery of activity in the case of accidental over-temperature operation.

Generally, it should be noted that in the practices of the present invention, neither the binary compound nor any component thereof is impregnated as a solution of a palladium and/or rare earth metal salt onto a support material such as activated alumina or the like. (Activated alumina is comprised mostly of gamma alumina although other phases are usually present.) It is known in the art of catalysis to impregnate a high surface material such as particles of activated alumina with an aqueous solution of a rare earth metal salt, such as a rare earth metal nitrate, e.g., cerium nitrate. This impregnation of the alumina particles with the salt solution is followed by calcination in air, in order to decompose the rare earth metal nitrate to the oxide, leaving the rare earth metal oxide dispersed throughout the lattice of the alumina. As is well known, such Impregnation stabilizes the high surface area alumina against thermal degradation, in which exposure to high temperature causes a phase change, such as gamma to alpha alumina, resulting in a collapse of the high surface area structure of the activated alumina. In contrast, in the practices of the present invention the binary oxide is mixed with a refractory binder (which may be alumina) in what may be referred to as "bulk" form. That is, the binary oxide (as well as the alumina) is in the form of particles of solid oxide material which are substantially insoluble in aqueous solution. Thus, solid particles of the binary oxide are admixed with solid particles of the binder and neither the binary oxide nor any portion thereof is impregnated into the alumina in the form of a solubilized precursor of the binary oxide. Indeed, there is some evidence that at least some of the binary oxides of the present invention could not exist or be made if it or the components thereof were to be diffused as a solubilized precursor into the alumina particles.

Generally, the compounds of this invention may be used to catalyze combustion of a combustion mixture of oxygen, e.g., air, and a gaseous carbonaceous fuel, including fuels, such as natural gas, which contain methane, without significant formation of NOx. Such combustion of the gaseous carbonaceous fuel may be carried out by methods known in the prior art as illustrated in, for example, U.S. Pat. No. 3,928,961 issued Dec. 30, 1975 to William C. Pfefferle.

FIG. 4 of the Pfefferle Patent and the description at column 10, lines 29-49, disclose a system in which a fuel-air combustion mixture is introduced into a catalyst zone 34 which may be sized to provide for combustion of only a minor portion of the fuel therein, with the major portion of the fuel being combusted by thermal combustion in a combustion zone 37 located downstream of the catalyst 34 and of larger volume than the catalyst 34. In this way combustion is initiated within a catalyst but the majority of the combustion takes place as thermal combustion in a zone downstream of the catalyst.

As explained in the aforesaid Pfefferle Patent, conventional, i.e., noncatalytic, thermal combustion systems of the type used for engines and power plants, such as gas turbines, operate at combustion temperatures which are high enough to form nitrogen oxides ("NOx") including NO. This is because spark-ignited flammable mixtures of fuels such as natural gas and methane combust at temperatures of about 3300° F. (1816° C.) or higher, which results in the formation of substantial amounts of NOx from atmospheric nitrogen. Catalytic combustion has the advantage of occurring at lower temperatures in which the formation of NOx is avoided or greatly reduced. However, because of limitations on the rate of mass transfer of the fuel and oxygen to the catalyst surface, either a prohibitively large surface area of catalyst must be provided or the mass transfer rate must be increased to such an extent that an excessively high pressure drop across the catalyst will be sustained. The Pfefferle Patent overcomes these difficulties by employing catalytically supported thermal combustion, based on the finding that if the operating temperature of the catalyst is increased substantially into the mass transfer limited region of operation the reaction rate begins to increase exponentially. Pfefferle theorized that the phenomenon may be explained by the fact that the catalyst surface and the gas layer near the catalyst surface are above a temperature at which thermal combustion occurs at a rate higher than the catalytic rate, and the temperature of the catalyst surface is above the instantaneous auto-ignition temperature of the fuel-air admixture. As a result, the fuel molecules entering this high temperature layer spontaneously burn without necessity of their being transported to the catalyst surface. As the combustion process proceeds, this high temperature gas layer becomes deeper until substantially the entire gas flow stream of the combustion mixture is ultimately raised to a temperature at which thermal combustion reactions occur. Consequently, the thermal combustion takes place throughout the entire gas stream, not merely adjacent the catalyst layer. The "instantaneous auto-ignition temperature" as defined by Pfefferle means that temperature at which the ignition lag of the fuel-air mixture entering the catalyst is negligible relative to the residence time in the combustion zone of the mixture undergoing combustion.

The Patent literature shows numerous further developments and modifications of the basic system disclosed by Pfefferle, including William C. Pfefferle U.S. Pat. Nos. 3,940,923, 3,846,979, 3,975,900, and 4,094,142. The disclosure of these Patents and of U.S. Pat. No. 3,928,961 is hereby incorporated by reference herein. In such a method, an intimate mixture of the fuel and air is formed and contacted in a combustion zone with a catalyst composition comprising the novel compound of this invention. Combustion of at least a portion of the fuel is thereby attained under essentially adiabatic conditions at a rate surmounting the mass transfer limitation to form an effluent of high thermal energy. The combustion zone may be maintained at a temperature of from about 925° C. to about 1650° C. and the combustion is generally carried out at a pressure of from 1 to 20 atmospheres. Configuration of the catalyst to employ the $M_2O_3.PdO$ catalysts of the present invention in a zone which during normal operation is exposed to temperatures which do not exceed about 950° C. will preclude significant deactivation of the catalyst during normal operation. Operating upsets which raise the temperature to levels, e.g., over 950° C., at which the $M_2O_3.PdO$ binary oxide compounds decompose, thereby inactivating the catalyst, may be rectified by cooling the catalyst to below about 950° C., e.g., to a temperature within the range 700° C. to 950° C., e.g., 750° C. to 790° C., thereby re-oxidizing the compound and regenerating the catalyst. On the other hand, the catalyst reactor may be configured to include the $2M_2O_3.PdO$ binary oxide compounds in a zone which during normal operation is exposed to temperatures which do not exceed the decomposition temperature of the $M_2O_3.PdO$ compound used, e.g., 1200° C. As shown in Example 3, the onset of decomposition of $2Nd_2O_3.PdO$ is 1230° C. and of $2La_2O_3.PdO$ is 1300° C.

The combustion catalyst of this invention may be used in a segmented catalyst bed such as described in, for example, U.S. Pat. No. 4,089,654. Dividing the catalyst configuration into segments is beneficial not only from an operational standpoint, but also in terms of monitoring the performance of various sections of the bed.

Although the invention has been shown and described with respect to preferred illustrative embodiments, it will be appreciated that numerous variations thereto will still lie within the scope of the present invention.

What is claimed is:

1. A catalyst composition comprising a refractory carrier on which is disposed a catalytic material comprising a mixture of a refractory inorganic binder, and a binary oxide of palladium and a rare earth metal.

2. The catalyst composition of claim 1 wherein the rare earth metal is selected from the group consisting of one or more of Ce, La, Nd, Pr and Sm.

3. The catalyst composition of claim 1 or claim 2 wherein the binary oxide is contained in a reaction product obtained by heating a reaction mixture of palladium oxide and the rare earth metal oxide to an elevated temperature for a time sufficient to react at least a portion of the palladium and rare earth metal oxide to form said binary oxide.

4. The catalyst composition of claim 1 wherein the binary oxide has the formula $2M_2O_3.PdO$, wherein M is the rare earth metal and is selected from the group consisting of La, Nd and Sm.

5. The catalyst composition of claim 1 wherein the binary oxide has the formula $M_2O_3.PdO$, wherein M is the rare earth metal and Is selected from the group consisting of La, Nd and Sm.

6. The catalyst composition of claim 4 or claim 5 wherein the binary oxide is contained in a reaction product obtained by heating a reaction mixture of palladium oxide and the rare earth metal oxide to an elevated temperature for a time sufficient to react at least a portion of the palladium and rare earth metal oxide to form said binary oxide, the palladium oxide (PdO) and the rare earth metal oxide ($M_2O_3$) being present in the reaction mixture in the same molar proportion as in the binary oxide.

7. The catalyst composition of claim 1 wherein the binary oxide comprises $La_2O_3.PdO$.

8. The catalyst composition of claim 7 wherein the binary oxide is contained in a reaction product obtained by heating a reaction mixture of palladium oxide and lanthanum oxide to an elevated temperature for a time sufficient to react at least a portion of the palladium and rare earth metal oxide to form said binary oxide, the palladium oxide and lanthanum oxide being present in the reaction mixture in the proportion of about one mole of $La_2O_3$ to one mole of PdO and the reaction product contains $La_2O_3.PdO$ as the binary oxide.

9. The catalyst composition of claim 3 wherein the binder is selected from the group consisting of one or more of silica, alumina, titania and zirconia.

10. The catalyst composition of claim 9 wherein the binder comprises alumina.

11. The catalyst composition of claim 3 wherein the binary oxide comprises from about 1 to 20 weight percent of said catalytic material.

12. The catalyst composition of claim 3 in which the carrier comprises a body having a plurality of parallel gas flow passages extending therethrough, the passages being defined by walls on which the catalytic material is deposited as a washcoat.

13. The catalyst composition of claim 1 wherein the amount of the binary oxide is effective to catalytically support combustion of a gaseous carbonaseous fuel.

* * * * *